(12) United States Patent
Singh et al.

(10) Patent No.: US 6,597,463 B1
(45) Date of Patent: Jul. 22, 2003

(54) SYSTEM TO DETERMINE SUITABILITY OF SION ARC SURFACE FOR DUV RESIST PATTERNING

(75) Inventors: Bhanwar Singh, Morgan Hill, CA (US); Cristina Cheung, San Jose, CA (US); Jay Bhakta, Sunnyvale, CA (US); Carmen Morales, San Jose, CA (US); Junwei Bao, Berkeley, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/880,591

(22) Filed: Jun. 13, 2001

(51) Int. Cl.[7] .............................................. G01B 11/06
(52) U.S. Cl. ....................... 356/630; 356/631; 356/369; 356/364
(58) Field of Search ................................ 356/630, 631, 356/369, 364, 365, 366, 367, 368, 563; 438/14, 15, 240, 8, 5, 11, 12, 17, 16, 763

(56) References Cited

U.S. PATENT DOCUMENTS

| | | | | |
|---|---|---|---|---|
| 4,495,558 A | * | 1/1985 | Cath et al. .................. 118/712 |
| 5,335,066 A | * | 8/1994 | Yamada et al. ............. 356/364 |
| 5,438,415 A | * | 8/1995 | Kazama et al. ............. 356/367 |
| 5,910,842 A | | 6/1999 | Piwonka-Corle et al. ... 356/369 |
| 5,917,594 A | | 6/1999 | Norton ....................... 356/327 |
| 5,973,787 A | | 10/1999 | Aspnes et al. .............. 356/369 |
| 6,130,105 A | * | 10/2000 | Redinbo et al. ............. 118/667 |
| 6,134,012 A | | 10/2000 | Aspnes et al. .............. 356/369 |
| 6,184,984 B1 | | 2/2001 | Lee et al. .................... 356/369 |
| 6,197,701 B1 | | 3/2001 | Shue et al. .................. 438/763 |
| 6,228,665 B1 | * | 5/2001 | Griffith et al. .............. 257/295 |
| 6,376,261 B1 | * | 4/2002 | Campbell .................... 257/48 |

* cited by examiner

Primary Examiner—Mohammad Sikder
(74) Attorney, Agent, or Firm—Amin & Turocy, LLP

(57) ABSTRACT

A system and method are disclosed for providing in-situ monitoring of an oxidized ARC layer disposed over an ARC layer. By monitoring the thickness of the oxidized portion of the ARC layer during semiconductor processing, one or more process control parameters may be adjusted to help achieve a desired oxidized portion thickness. As a result, the number of process steps required to achieve the desired oxidized portion thickness may be reduced, providing a more efficient and economical process

26 Claims, 11 Drawing Sheets

SYSTEM TO DETERMINE SUITABILITY OF SION ARC SURFACE FOR DUV RESIST PATTERNING

FIELD OF THE INVENTION

The present invention generally relates to semiconductor processing and, more particularly, to a system and method for optimizing oxidation of an anti-reflective coating layer.

BACKGROUND OF THE INVENTION

In the semiconductor industry, there is a continuing trend toward higher device densities. To achieve these high densities there has been and continues to be efforts toward scaling down device dimensions (e.g., at submicron levels) on semiconductor wafers. In order to accomplish such high device packing density, smaller and smaller feature sizes are required. This may include the width and spacing of interconnecting lines, spacing and diameter of contact holes, and the surface geometry such as corners and edges of various features.

The requirement of small features with close spacing between adjacent features requires high resolution photolithographic processes. In general, lithography refers to processes for pattern transfer between various media. It is a technique used for integrated circuit fabrication in which a silicon slice, the wafer, is coated uniformly with a radiation-sensitive film, the resist, and an exposing source (such as optical light, x-rays, or an electron beam) illuminates selected areas of the surface through an intervening master template, the mask, for a particular pattern. The lithographic coating is generally a radiation-sensitive coating suitable for receiving a projected image of the subject pattern. Once the image is projected, it is indelibly formed in the coating. The projected image may be either a negative or a positive image of the subject pattern. Exposure of the coating through a photomask causes the image area to become either more or less soluble (depending on the coating) in a particular solvent developer. The more soluble areas are removed in the developing process to leave the pattern image in the coating as less soluble polymer.

Present techniques in optical projection printing can resolve images of sub-micron when photoresists with good linewidth control are used. However, reflection of light from substrate/resist interfaces produce variations in light intensity and scattering of light in the resist during exposure, resulting in non-uniform photoresist linewidth upon development. Constructive and destructive interference resulting from reflected light is particularly significant when monochromatic or quasi-monochromatic light is used for photoresist exposure. In such cases, the reflected light interferes with the incident light to form standing waves within the resist. In the case of highly reflective substrate regions, the problem is exacerbated since large amplitude standing waves create thin layers of underexposed resist at the wave minima. The underexposed layers can prevent complete resist development causing edge acuity problems in the resist profile.

Antireflective coatings are known and used to mitigate the aforementioned problems. However, the antireflective coatings (ARC) layers are not sufficient during employment of Deep Ultraviolet (DUV) type resist due to the acid formation in the resist when exposed. Therefore, when utilizing DUV resist, the top portions of the ARC layer is oxidized to mitigate footing of the patterned features after development of the photoresist layer. The thickness of the oxidized ARC layer compared to the thickness of the non-oxidized portion of the ARC layer is critical. Insufficient oxidization results in problems with critical dimension control, which results in costly rework or scrapping of the patterned wafer. Therefore, there is an unmet need for a system and method for determining and controlling the appropriate oxidation of an ARC layer during a photoresist process.

SUMMARY

The present invention relates to a system and method for providing in-situ thickness and process monitoring to help achieve a desired thickness of an oxidized ARC portion disposed over an ARC layer. By monitoring the thickness of the oxidized portion of the ARC layer during semiconductor processing, one or more process control parameters may be adjusted to help achieve a desired oxidized portion thickness. As a result, the number of process steps required to achieve the desired oxidized portion thickness may be reduced, providing a more efficient and economical process.

One aspect of the present invention provides a semiconductor processing system. The system includes a processing chamber operable to form an oxidized ARC layer or portion over an ARC layer on a substrate located in the chamber. A spectroscopic ellipsometry system performs in-situ thickness measurements of the oxidized portion being formed and provides a measurement signal indicative of the measured thickness. Alternatively, a spectroscopic reflectometry system can be employed alone or in combination with the spectroscopic ellipsometry system. In accordance with another aspect of the present invention, the thickness of the ARC layer may also be monitored and controlled. A signature is then generated utilizing the measurement signal and the signature is compared with a library of signatures to determine the thickness of the oxidized portion.

Yet another aspect of the present invention provides a method to facilitate formation of an oxidized portion of an ARC layer on a substrate. The method includes forming an oxidized portion of an ARC over an ARC layer disposed on the substrate. A polarized broadband light beam is transmitted at the oxidized portion and a measurement signal is generated based on the reflected portion of the polarized broadband light beam. The thickness of the oxidized portion is then determined based on the measurement signal while the oxidized portion is being formed at the substrate.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for determining and controlling the appropriate oxidation of an ARC layer. One aspect of the invention relates to a system and method employing ellipsometry scattering or reflectometry scattering to facilitate determining thickness of an ARC layer and an oxidized portion of the ARC layer. The system and method mitigate footing problems associated with utilizing deep ultraviolet (DUV) photoresist layers in patterning processes of a semiconductor substrate. The system and method employ a library of signatures which are stored in a memory. A beam is directed to the surface of an ARC, and the reflected beam is collected and analyzed. A signature(s) of the reflected beam is generated and this signature(s) is compared to the signatures of the library, so as to determine the approximate thickness of the ARC layer. The ARC layer is then oxidized and the process is repeated for the oxidized portion of the ARC. Alternatively, the thickness of the ARC layer can be determined after or during formation of the oxidized portion of the ARC layer. The system and method can be employed in-situ, so that the thickness of either or both the ARC layer and the oxidized portion of the ARC layer can be monitored and controlled.

Figure 1:
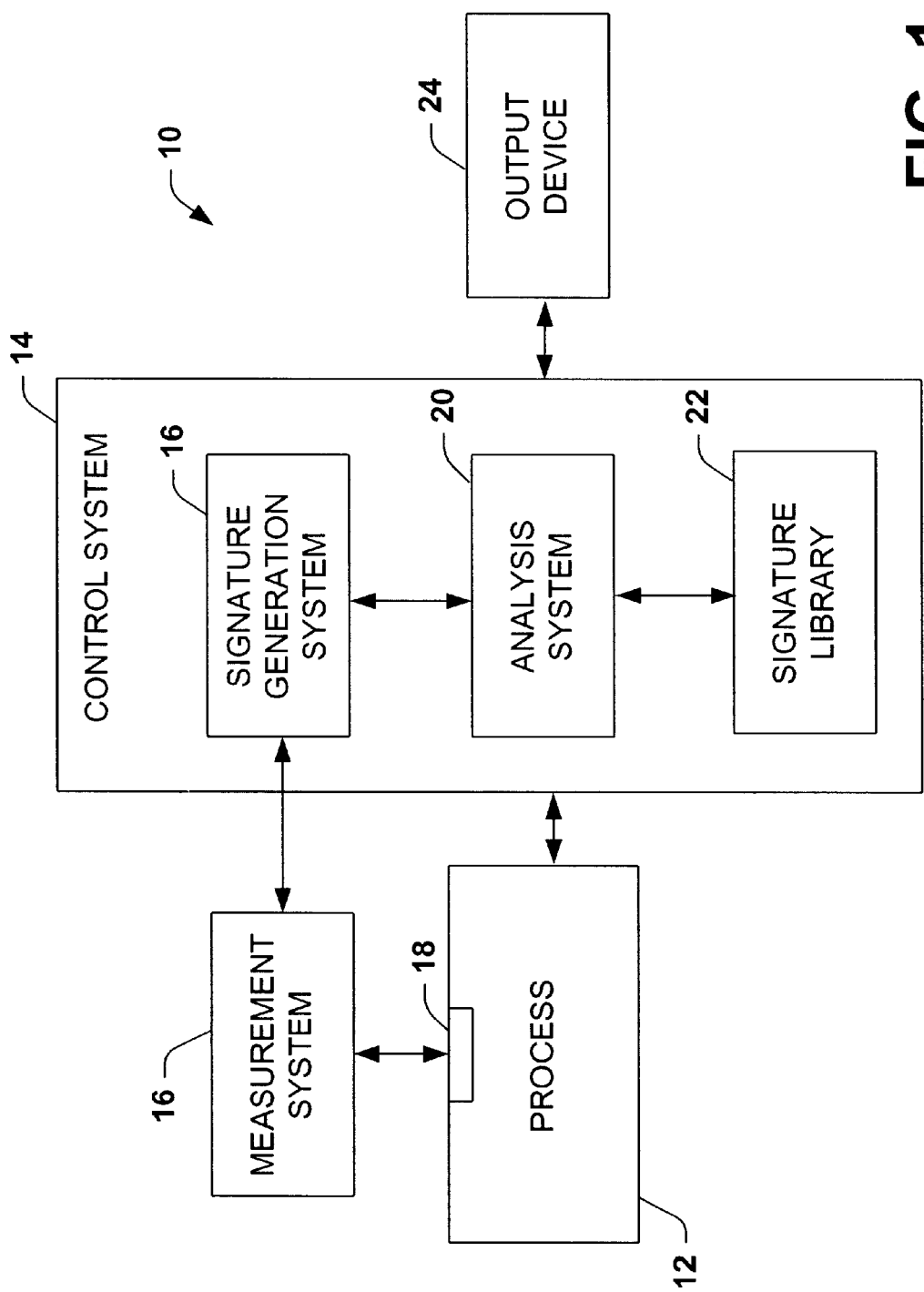
FIG. 1 is a diagramatic block representation of a system in accordance with one aspect of the present invention.

FIG. 1 illustrates a system 10 for in-situ of thickness measurements of a process of forming an ARC layer and an oxidized portion of an ARC layer, schematically indicated at 12. The process 12, for example, includes thin film growth, etching, and/or thin film deposition of an ARC layer (e.g., SiON) on top of the layer to be patterned (e.g., polysilicon, oxide, metal). The process, for example, can include oxidation of the ARC layer by injection of oxygen into the process causing a top portion of the ARC layer to oxidize. Alternatively, an ARC material may be oxidized and grown or deposited on top of the ARC layer. The system 10 also includes a control system 14 for controlling operating characteristics of the process 12. The operating characteristics associated with the process 12 may include, for example, deposition and/or oxidation enablement, the temperature, concentration of gases within the process, pressure associated with the process, and timing parameters associated with different steps in a multi-step fabrication process. The control system 14 may adjust one or more selected operating parameters of the process based on sensed operating conditions associated with the process 12.

A measurement system 16 is operatively associated with the process 12 to measure in-situ thickness of the ARC layer and/or oxidized portion of the ARC layer while it is being formed. That is, the measurement system 16 includes a thickness monitoring portion 18, which may be located within (or be integrated into) the process 12, such as may include an enclosed processing chamber. The measurement system 16, for example, samples the thickness of layers being formed on the substrate at one or more locations, such as near the center and near one or more edge locations of the substrate. In particular, it may be desirable to obtain measurements from two or more spaced apart locations, such as at the center and one or more edge positions. Such measurements may enable a better determination as to uniformity of the layer thickness, which in accordance with an aspect of the present invention, may be employed to adjust the fabrication process to achieve a desired level of uniformity of layer thickness.

The measurement system 16 may implement any known technique operable to measure the thickness of the thin film being formed in the process 12. Examples of techniques that may be utilized in accordance with an aspect of the present invention include optical interference, ellipsometry, reflectometry, capacitance, and use of an associated color chart. Microprocessor controlled optical interference (e.g., microspectrophotometry) and spectroscopic ellipsometry are two common types of optical measurement techniques that could be utilized.

By way of further illustration, scatterometry may be employed to extract information about a surface of a substrate upon which an incident light has been directed. One or more gratings may be located on a substrate. Such gratings may be formed on the substrate, for example, at the same stage in fabrication when alignment markers are formed thereon, such as by etching. Light reflected, and/or passed through, the one or more gratings and/or features is collected by one or more light detecting components of the measurement system 16. It is to be appreciated that any suitable scatterometry system may be employed to carry out the present invention, and such systems are intended to fall within the scope of the claims.

The measurement system 16 is coupled to the control system 14 for providing a signal indicative of the measured layer thickness being formed in the process 12. The control system 14, for example, includes memory (not shown) for storing a target layer thickness, which may vary according to the process. The control system 16 also includes a signature generation system 16, which creates a signature from the signal measurements over a predetermined frequency range and/or angle of retardation. The control system 16 also includes a signature library 22 that includes hundreds of thousands of signatures, each corresponding to a particular type and thickness of ARC and/or oxidized ARC layer.

An analysis system 20 is provided for comparing the generated signature with signatures in the signature library 22. By examining a signature library 22 of intensity/phase signatures, a determination can be made concerning the properties of the surface, such as the thickness of the layer being formed thereon. The control system 14 is coupled to the process 18 and may be programmed and/or configured to compare the measured thickness relative to the target thickness and determine what action (if any) should be taken to drive the process 12, so that a target thickness and/or a desired level of uniformity of thickness may be achieved. The control system 18 is also coupled to an output device 24, so that results can be displayed to a user.

The system 10 further may include one or more other process sensors (not shown) for monitoring process operating conditions and providing an indication of such conditions to the control system 14. The control system 14 thus is able to adjust process operating characteristics based on the measured thickness (e.g., based on a signal from the measurement system 16) and the sensed process operating conditions (e.g., based on a signal from the other process sensors). In this way, the control system 14 may selectively refine the ARC formation and oxidation process 12 to accommodate variations in sensed process conditions and measured layer thickness at various stages of the layer formation process. For example, the control system 14 may adjust gas flow rates, pressure, temperature, thermal oxidation time, and/or layer formation time (e.g., deposition time or layer growth time) based on the conditions monitored by the measurement system 16 and the sensor(s). As a result, the system 10 is capable of achieving a more precise and/or uniform film thickness without an increase in process steps to refine the process.

In one aspect of the invention, the present invention employs spectroscopic ellipsometry. Ellipsometry is a nondestructive optical technique, which deals with the measurement and interpretation state of polarized light undergoing oblique reflection from a sample surface. The quantities measured by an ellipsometer are ellipsometric angles Psi (amplitude ratio) and Delta (phase changes) which are related to the complex ratio of the Fresnel reflection coefficient Rp and Rs for light polarized parallel (p) and perpendicular (s) to the plane of incidence such that Rp/Rs=tan (PSI)$e^{iDELTA}$.

Ellipsometric data can be taken at multiple wavelengths (spectroscopic ellipsometry) and also at different angles of incidence. The experimental result of the spectroscopic variable angle of incidence ellipsometry measurements can be expressed as cos (Delta) and tan (Psi). These additional ellipsometric measurements provide much more information about the samples that can be obtained from a single wavelength and angle measurements. Spectroscopic ellipsometry is more suited for in-situ applications while spectroscopic variable angle of incidence ellipsometry allows for a more comprehensive ex-situ characterization. One type of spectroscopic ellipsometer is based on a mechanically rotating single polarizing element, polarizer (RP) or analyzer (RA). Another type is based on phase modulation (PM), where the polarizers are fixed and an additional element, the analyzer, performs the modulation function. It is to be appreciated that various types of spectroscopic ellipsometry techniques may be employed to carry out the present invention.

Figure 2:
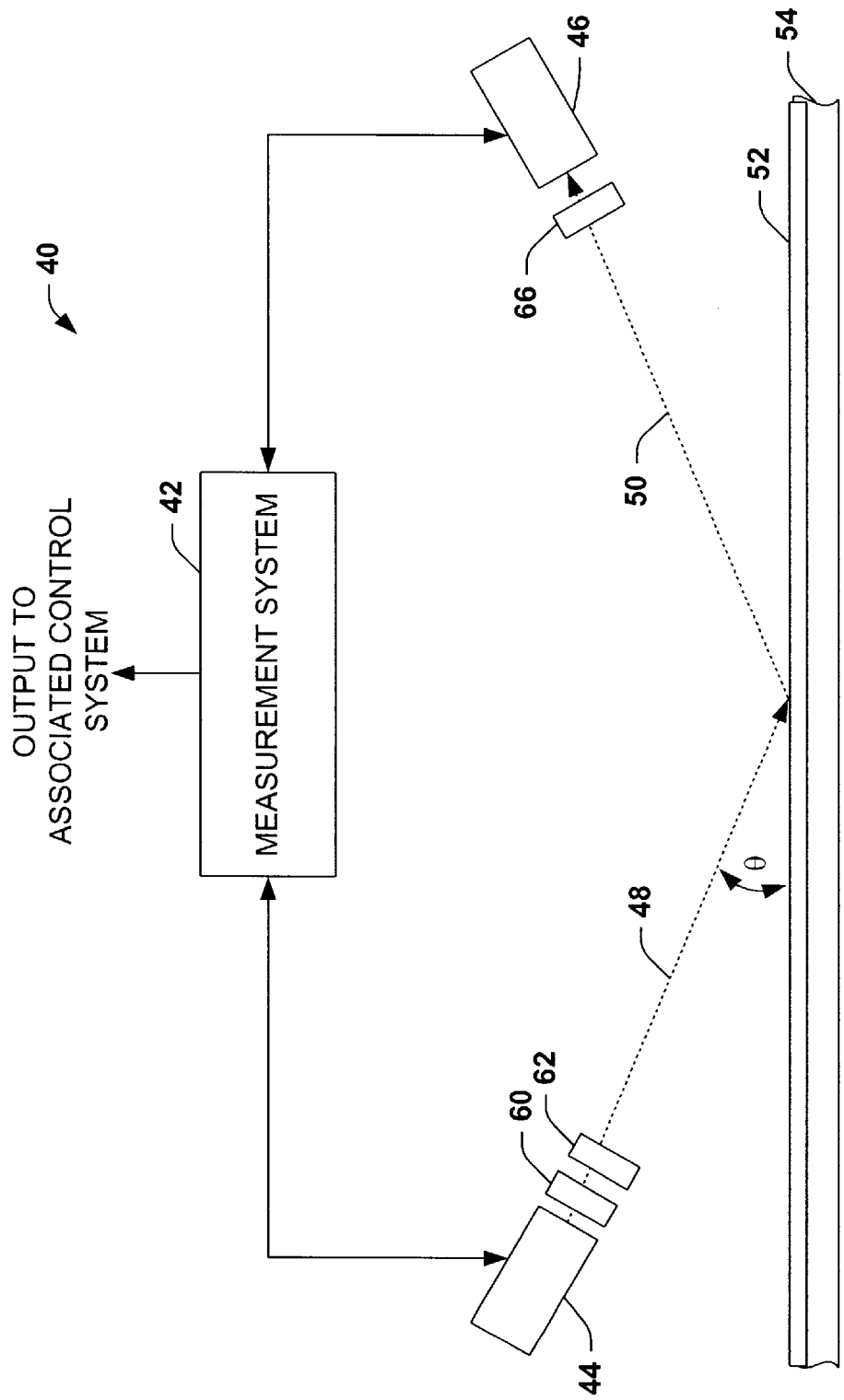
FIG. 2 is a block diagram illustrating an example of a measurement system employing ellipsometry that may be utilized in accordance with one aspect of the present invention.

FIG. 2 illustrates an example of a spectroscopic ellipsometry system 40 that may be implemented, in accordance with an aspect of the present invention, to measure the thickness of an oxidized portion 52 as it is formed on an ARC layer 54. The ellipsometry system 40 includes a measurement system 42 coupled to a light source 44 and an optical detector 46. The light source 44 is a broadband lights source, such as a Xe Arc lamp or the like. The light source 44 produces a spectrum of polychromatic light over a predetermined wavelength range of interest (e.g., 100–800 nm). The light beam 48 from the light source 44 is collimated by a lens assembly 60 comprised of one or more lenses and/or mirrors. The beam 48 then interacts with a polarizer 62 to create a known polarizer state. Various polarizers may be employed to carry out the present invention. The azimuth angle of the polarizer is oriented so that the plane of the electric vector associated with the linearly polarized beam exiting from the polarizer 62 is at a known angle ? relative to the plane of incidence defined by the propagation direction of the beam and the normal N to the exposed surface of the ARC layer 54.

The azimuth angle is selected, so that the reflected intensities of the P and S polarized components are approximately balanced (e.g., 25–50°). At least a portion of the beam is reflected, indicated at 50, and received at the optical detector 46. The beam 50 will have a mixed linear and circular polarization state after interacting with the oxidized portion 52 of the ARC layer 54. The reflected beam will then pass through an analyzer 66, which serves to mix the polarization states incident on it. Either the polarizer 62 or the analyzer 66 is rotated, so that the detector 46 can characterize the beam. The beam then enters the detector 46 which measure the intensity of the different wavelengths of light through the wavelength range of interest that pass through the analyzer 66. The detector 46 or the measurement system 42 then determines, for example, the tan (PSI) and the cos (Delta) and utilizes this determination in relating a signature to the thickness of the oxidized portion 52 of the ARC layer 54 and/or the thickness of the ARC layer 54.

In accordance with a particular aspect of the present invention, the ellipsometry system further may collect measurement data substantially concurrently at spaced apart locations along the surface of the layer being formed, such as at opposed side edges and a center location. The measurements made at spaced apart locations may be employed to determine uniformity of the oxidized layer being formed across the surface of the ARC layer. Moreover, upon determining a generally non-uniform layer, selected fabrication process parameters may be adjusted to facilitate uniform layer formation.

Figure 3:
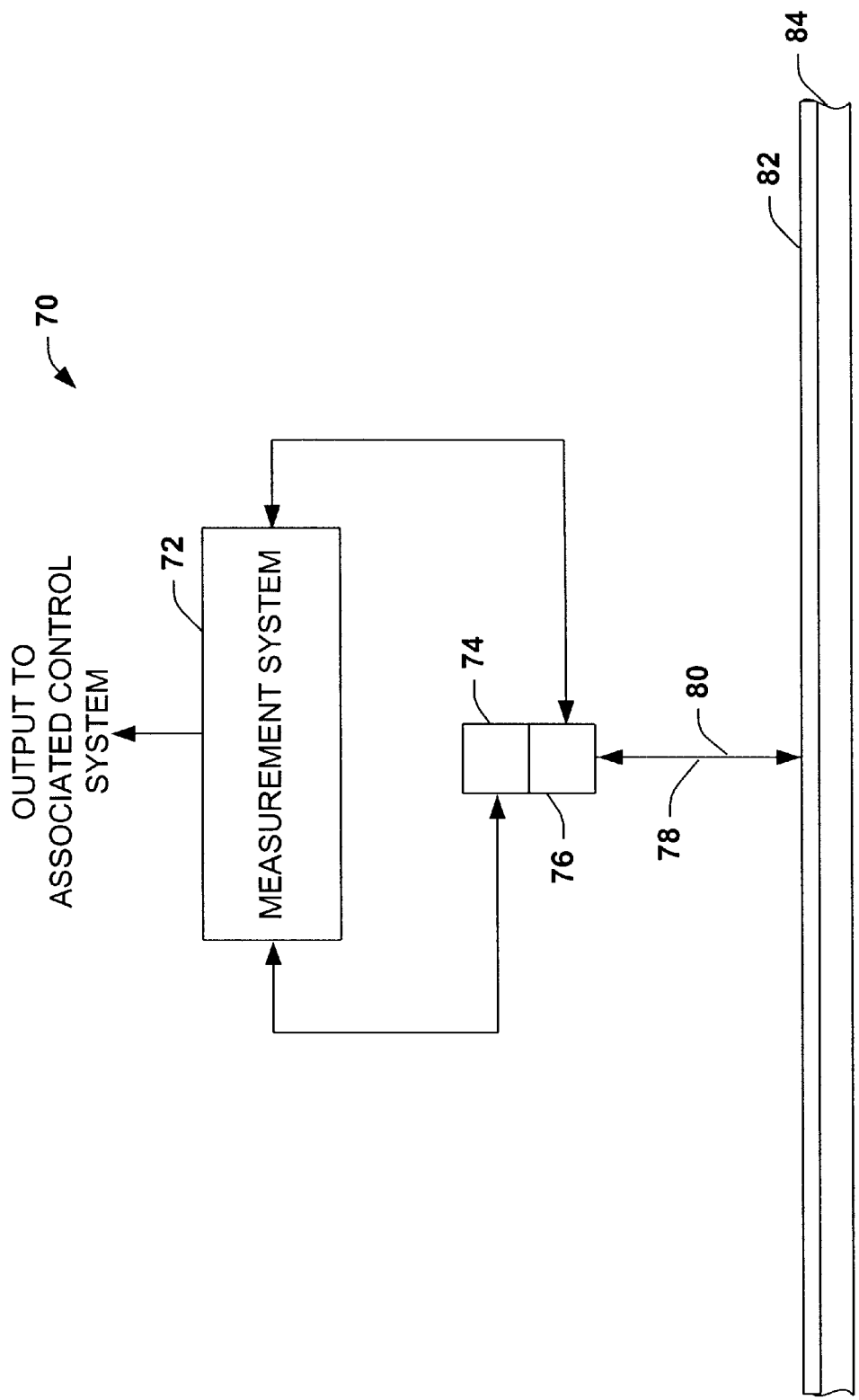
FIG. 3 is a block diagram illustrating an example of a measurement system employing reflectometry that may be utilized in accordance with one aspect of the present invention.

In another aspect of the invention a reflectometry technique is employed to determine the thickness of an oxidized portion of an ARC layer. By way of further illustration, FIG. 3 illustrates an example of reflectometry technique 70 that may be employed to derive an indication of the thickness of an oxidized portion 82 as it is formed on an ARC layer 84. In the reflectometry technique of FIG. 3, a light source 76 emits a beam of light 78 that is supplied at a fixed incident angle (e.g., about 90 degrees) relative to the oxidized portion 82 and the ARC layer 84. The spectral reflectivity of the oxidized portion 82 is modulated by optical interference. The effect of the interference on the measured spectrum is a function of the oxidized portion 82 and the ARC layer 84 refractive indices. For example, if the wavelength of the incident beam 78 is varied, such as between a wavelength in the range of about 100–800 nm, and if the dispersion components of the refractive indices are known over the wavelength range, the thickness of the oxidized portion can be found using a Fourier transform technique. Other transformation techniques can be employed to carry out the present invention. The light source 76, for example, can be a frequency-stabilized laser; however, it will be appreciated that any laser or other light source (e.g., laser diode or helium neon (HeNe) gas laser) suitable for carrying out the present invention may be employed.

The intensity of the reflected light beam 78 may be measured as a function of its wavelength, with a minimal intensity being used to calculate the thickness of the oxide portion 82. At least some of the incident light 78 is reflected as a reflected beam of light 80, which is received at an optical detector 74. A measurement system 72, for example, may control the light source 76 and the detector 74 so as to derive an indication of the optical properties associated with the oxidized portion 82 of the ARC 84 with which the incident beam 78 interacts. The measurement system 72, in turn, may provide an indication of the measured optical properties to an associated control system.

By way of example, the measurement system 72 may employ pre-selected values for the index of refraction to automatically calculate the thickness of the oxidized portion 82 from the measure properties of the reflected beam 80 relative to the incident beam 78. The information provided by the measurement system 72, for example, may include an indication of the thickness, such as based on analysis of the magnitude and phase of the incident and reflected light beams 78 and 80, respectively. Alternatively, the measurement system 72 may provide raw data to its associated control system, which may employ such data to derive an indication of the thickness based on the measured optical properties, such as described hereinabove.

FIGS. 4–9 illustrate examples of a system for employing ellipsometry techniques to determine the thickness of an oxidized portion of an ARC layer. However, it is to be appreciated that a reflectometry technique can also be employed in the systems illustrated in FIGS. 4–9.

Figure 4:
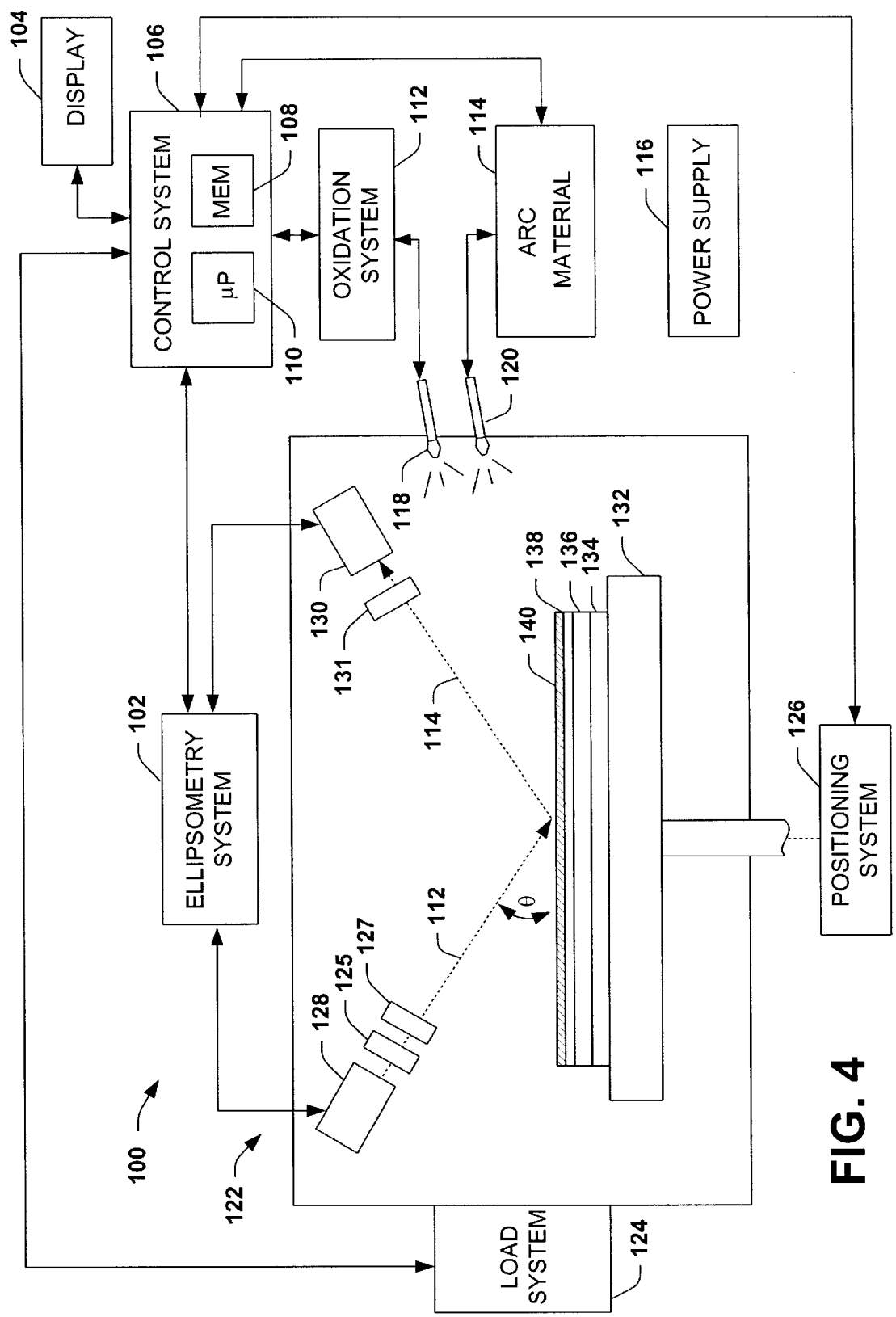
FIG. 4 is a functional block diagram of a system in accordance with one aspect of the present invention.

FIG. 4 illustrates a system 100 having an ellipsometry system 102 for in-situ layer thickness monitoring in accordance with an aspect of the present invention. In this example, the system 100 forms an ARC layer 138 by chemical vapor deposition (CVD). The ARC layer 138 is formed over an insulating layer 136 disposed over a substrate 134. Examples of CVD processes that may be utilized, in accordance with an aspect of the present invention, include Low Pressure CVD (LPCVD), Plasma Enhanced CVD (PECVD), and Rapid Thermal CVD (RTCVD). It is to be appreciated, however, that the present invention is applicable to other types of thin film formation, such as other deposition techniques (e.g., Physical Vapor Deposition (PVD), Metal Organic Chemical Vapor Deposition (MOCVD), Pulsed Laser Deposition (PLD)) and film growth techniques.

The system 100 includes a process chamber 122 that includes a support, such as a stage 132 (or chuck) operative to support the substrate 134, such as a wafer. A positioning system 126 is operatively connected to the support 132 for positioning the stage 132 at a desired position within the chamber 122. It is to be appreciated that wafer positioning systems are rapidly evolving and that any such system may be employed in accordance with an aspect of the present invention.

An ARC material layer gas distribution system 114 is operably coupled to the chamber 122 for selectively providing gaseous chemicals into the chamber to form the ARC film layer 138 on the substrate 134. By way of illustration, the gas distribution system 114 includes a source of a gaseous medium (a vapor) of ARC material (e.g., silicon oxynitride) to be formed on the substrate. The gas is provided into the chamber through a conduit that terminates in a nozzle, indicated at 120. While, for purposes of brevity, a single nozzle 120 is shown in FIG. 4, it is to be appreciated that more than one nozzle or other gas delivery mechanisms may be utilized to provide gas into the chamber 122 for film formation in accordance with an aspect of the present invention.

An oxidation system 112 also is provided for controlling the injection of oxygen into the processing chamber 122. The oxidation system 112 is adapted to inject oxygen into the chamber 122 to oxidize the ARC layer 138 and form the oxidized ARC portion 140. By way of illustration, the oxidation system 112 includes a source of oxygen to be injected into the chamber 122. The oxygen is provided into the chamber through a conduit that terminates in a nozzle, indicated at 118. Although, a single nozzle 118 is shown in FIG. 4, it is to be appreciated that more than one nozzle or other oxygen delivery mechanisms may be utilized to provide oxygen into the chamber 122 for oxidation of the top portion of the ARC layer 138 in accordance with an aspect of the present invention.

The system 100 also may include a load system 124 operatively connected to the chamber 122 for loading and unloading substrates (e.g., wafers) into and out of the processing chamber. The load system 124 typically is automated to load and unload the wafers into the chamber at a controlled rate.

The ellipsometry system 102 is operative to measure film thickness in-situ, in accordance with an aspect of the present invention. In the example illustrated in FIG. 4, the ellipsometry system 102 is operative to measure the thickness of the ARC layer 138 in addition to the thickness of the oxidized portion 140 of the ARC layer 138. The ellipsometry system 102 includes a broadband light source 128, a lens assembly 125, a polarizer 127, an analyzer 131 and a detector 130. The ellipsometry system 102 operates in the same manner as the ellipsometry system 40 described in FIG. 2. The broadband light source 128 provides a light beam 112 toward an exposed surface of the substrate 134 at which the layer is being formed. The beam 112 interacts with the surface and layer(s) and is reflected. The reflected beam(s) 114, which is received at the detector portion of the source/detector 130, has beam properties (e.g., magnitude and/or phase), which may be employed to determine an indication of layer thickness. A plurality of incident beams from one or more sources also may be directed at different spaced apart locations of the substrate to obtain corresponding measurements of layer thickness substantially concurrently during the fabrication process. The concurrent measurements, in turn, provide an indication of the uniformity of layer thickness across the substrate.

For the example of optical interference, the intensity of light over a selected wavelength varies as a function of layer thickness. For spectroscopic ellipsometry, thickness varies based on the state of polarization of light reflected from the film, which is functionally related to the index of refraction of the material reflecting the beam 112.

By way of further illustration, the substrate 134 has gratings formed thereon, such as may be formed concurrently with alignment markings on the substrate. The gratings, for example, may range from about 10×10 μm to about 100×100 μm, such as depending on the type of measurement tool being employed. The ellipsometry system, in turn, may employ a scatterometry technique using spectroscopic ellipsometry to measure thickness of films being applied at the gratings. Thus, the ellipsometry system 102 may measure properties of the wafer at opposed sides of the substrate 134 and near the center.

Using a spectroscopic ellipsometry technique, for example, desired information concerning layer thickness can be extracted by comparing the phase and/or intensity (magnitude) of the light directed onto the surface with phase and/or intensity signals of a complex reflected and/or diffracted light resulting from the incident light reflecting from and/or diffracting through the surface upon which the incident light was directed. The intensity and/or the phase of the reflected and/or diffracted light will change based on properties of the surface upon which the light is directed, including layer thickness.

Different combinations of the above-mentioned properties will have different effects on the phase and/or intensity of the incident light resulting in substantially unique intensity/phase signatures in the complex reflected and/or diffracted light. The spectroscopic ellipsometry system 102 provides information indicative of the measured properties to a control system 106. Such information may be the raw phase and intensity information. Alternatively or additionally, the spectroscopic ellipsometry system 102 may be designed to derive an indication of layer thickness based on the measured optical properties and provide the control system 106 with a signal indicative of the measured layer thickness according to the detected optical properties. The phase and intensity of the reflected light can be measured and plotted.

In order to determine layer thickness, for example, measured signal characteristics may be employed to generate a signature corresponding to the Tan (PSI) over the broadband frequency range and a signature corresponding to the Cos (Delta) over the broadband frequency range. The generated signatures may be compared with a signal (signature) library of intensity/phase signatures to determine the thickness of the ARC layer 138 and/or the thickness of the oxidized portion 140 of the ARC layer. Such substantially unique phase/intensity signatures are produced by light reflected from and/or refracted by different surfaces due, at least in part, to the complex index of refraction of the surface onto which the light is directed.

The signal (signature) library can be constructed from observed intensity/phase signatures and/or signatures generated by modeling and simulation. By way of illustration, when exposed to a first incident light of known intensity, wavelength and phase, a first feature on a wafer can generate a first component of a phase/intensity signature. Similarly, when exposed to the first incident light of known intensity, wavelength and phase, a second feature on a wafer can generate a second component of a phase/intensity signature. The components can be determined over a broadband range of wavelengths and aggregated to form a signature. For example, a particular type of thin film having a first thickness may generate a first signature while the same type of film having a different thickness may generate a second signature, which is different from the first signature.

Observed signatures can be combined with simulated and modeled signatures to form the signal (signature) library. Simulation and modeling can be employed to produce signatures against which measured phase/intensity signatures can be matched. In one exemplary aspect of the present invention, simulation, modeling and observed signatures are stored in a signal (signature) library containing, for example, over three hundred thousand phase/intensity signatures. Thus, when the phase/intensity signals are received from ellipsometry detecting components, the phase/intensity signals can be pattern matched, for example, to the library of signals to determine whether the signals correspond to a stored signature. Interpolation between the two closest matching signatures further may be employed to discern a more accurate indication of thickness from the signatures in the signature library. Alternatively, artificial intelligence techniques may be employed to calculate desired parameters of the wafer under test based on the detected optical properties.

The control system 106 includes a processor 110, such as a microprocessor or CPU, coupled to a memory 108. The processor 110 receives measured data from the spectroscopic ellipsometry system 102. The processor 110 also is operatively coupled to the ARC material gas distribution system 114, the oxidation system 112, the positioning system 126 and the load station 124. The control system 106 is programmed/and or configured to control and operate the various components within the processing system 100 in order to carry out the various functions described herein.

The processor 110 may be any of a plurality of processors, such as the AMD K6, ATHLON or other similar processors. The manner in which the processor 110 can be programmed to carry out the functions relating to the present invention will be readily apparent to those having ordinary skill in the art based on the description provided herein.

The memory 108 serves to store program code executed by the processor 110 for carrying out operating functions of the system as described herein. The memory 108 may include read only memory (ROM) and random access memory (RAM). The ROM contains among other code the Basic Input-Output System (BIOS) which controls the basic hardware operations of the system 100. The RAM is the main memory into which the operating system and application programs are loaded. The memory 108 also serves as a storage medium for temporarily storing information such as temperature, temperature tables, position coordinate tables, interferometry information, thickness tables, and algorithms that may be employed in carrying out the present invention. The memory 108 also can hold patterns against which observed data can be compared as well as information concerning grating sizes, grating shapes, ellipsometry information, achieved profiles, desired profiles and other data that may be employed in carrying out the present invention. For mass data storage, the memory 108 may include a hard disk drive.

A power supply 116 provides operating power to the system 100. Any suitable power supply (e.g., battery, line power) may be employed to carry out the present invention. The system further may include a display 104 operatively coupled to the control system 106 for displaying a representation (e.g., graphical and/or text) of one or more process conditions, such as layer thickness, temperature, gas flow rates, etc. The display 104 further may show a graphical and/or textual representation of the measured optical properties (e.g., refraction index and absorption constant) at various locations along the surface of the substrate.

As a result, the system 100 provides for monitoring process conditions, including layer thickness and other sensed process-related conditions, associated with the layer formation process within the chamber 122. The monitored conditions provide data based on which the control system 106 may implement feedback process control so as to form a layer having a desired thickness, such as a uniform thickness across the substrate.

Figure 5:
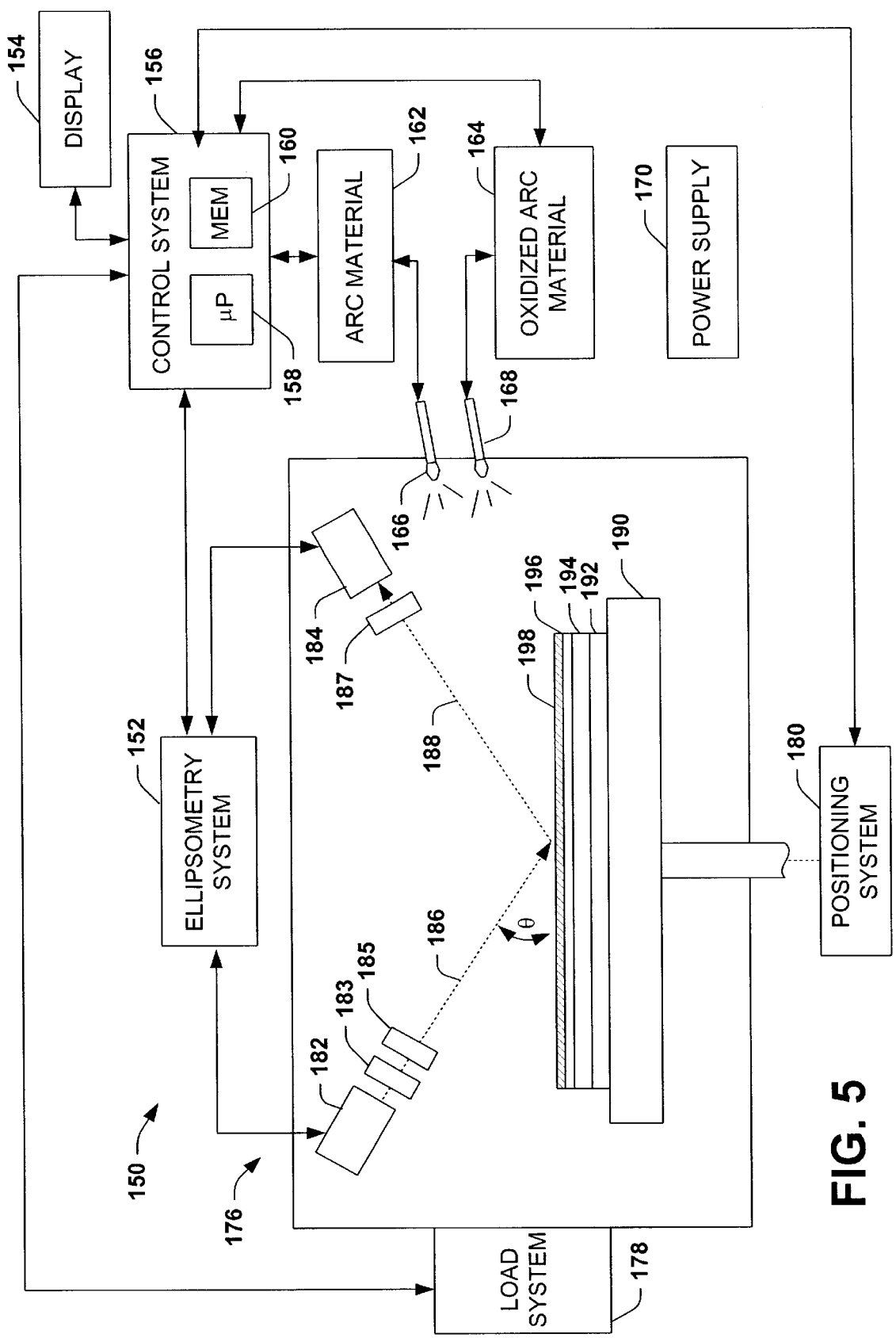
FIG. 5 is a functional block diagram of an alternate system in accordance with one aspect of the present invention.

FIG. 5 illustrates an alternate system 150 having a spectroscopic ellipsometry system 152 for in-situ layer thickness monitoring in accordance with an aspect of the present invention. In this example, the system 150 forms an ARC layer 196 by chemical vapor deposition (CVD). The ARC layer 196 is formed over an insulating layer 194 disposed over a substrate 192. Additionally, an oxidized ARC layer 198 is formed over the ARC layer 196 by chemical vapor deposition. Examples of CVD processes that may be utilized, in accordance with an aspect of the present invention, include Low Pressure CVD (LPCVD), Plasma Enhanced CVD (PECVD), and Rapid Thermal CVD (RTCVD). It is to be appreciated, however, that the present invention is applicable to other types of thin film formation, such as other deposition techniques (e.g., Physical Vapor Deposition (PVD), Metal Organic Chemical Vapor Deposition (MOCVD), Pulsed Laser Deposition (PLD)) and film growth techniques.

The system 150 includes a process chamber 176 that includes a support, such as a stage 190 (or chuck) operative to support the substrate 192, such as a wafer. A positioning system 180 is operatively connected to the support 190 for positioning the stage 190 at a desired position within the chamber 176.

An ARC material layer gas distribution system 162 is operably coupled to the chamber 176 for selectively providing gaseous chemicals into the chamber to form the ARC film layer 196 on the substrate 192. By way of illustration, the gas distribution system 162 includes a source of a gaseous medium (a vapor) of ARC material (e.g., silicon oxynitride) to be formed on the substrate 192. The gas is provided into the chamber through a conduit that terminates in a nozzle, indicated at 166. An oxidized ARC material layer gas distribution system 164 is operably coupled to the chamber 176 for selectively providing gaseous chemicals into the chamber to form the oxidized ARC film layer 198 on the substrate 192. By way of illustration, the gas distribution system 164 includes a source of a gaseous medium (a vapor) of an oxidized ARC material (e.g., oxidized silicon oxynitride) to be formed on the substrate. The gas is provided into the chamber through a conduit that terminates in a nozzle, indicated at 168.

The system 150 also may include a load system 178 operatively connected to the chamber 176 for loading and unloading substrates (e.g., wafers) into and out of the processing chamber. The load system 178 typically is automated to load and unload the wafers into the chamber at a controlled rate.

The spectroscopic ellipsometry system 152 is operative to measure layer thickness in-situ, in accordance with an aspect of the present invention. The spectroscopic ellipsometry system 152 is operative to measure the thickness of the ARC layer 196 in addition to the thickness of the oxidized ARC layer 198. The spectroscopic ellipsometry system 152 includes a broadband light source 182, a lens assembly 183, a polarizer 185, an analyzer 187 and a detector 184. The spectroscopic ellipsometry system 152 operates in the same manner as the spectroscopic ellipsometry system described in FIG. 2. The broadband light source 182 provides a light beam 186 toward an exposed surface of the substrate 192 at which the layer is being formed. The beam 186 interacts with the surface and layer and is reflected. The reflected beam(s) 188, received at the detector 184, has beam properties (e.g., magnitude and/or phase), which may be employed to determine an indication of layer thickness.

The spectroscopic ellipsometry system 152 provides information indicative of the measured properties to a control system 156. Such information may be the raw phase and intensity information. Alternatively or additionally, the spectroscopic ellipsometry system 152 may be designed to derive an indication of film thickness based on the measured optical properties and provide the control system 156 with a signal indicative of the measured layer thickness according to the detected optical properties. The phase and intensity of the reflected light can be measured and plotted.

In order to determine film thickness, for example, measured signal characteristics may be employed to generate a signature component corresponding to the Tan (PSI) over the broadband frequency range and a signature component corresponding to the Cos (Delta) over the broadband frequency range. The generated signatures may be compared with a signal (signature) library of intensity/phase signatures to determine the thickness of the ARC layer 196 and/or the thickness of the oxidized ARC layer 198. Such substantially unique phase/intensity signatures are produced by light reflected from and/or refracted by different surfaces due, at least in part, to the complex index of refraction of the surface onto which the light is directed.

The control system 156 includes a processor 158, such as a microprocessor or CPU, coupled to a memory 156. The processor 158 receives measured data from the spectroscopic ellipsometry system 152. The processor 158 also is operatively coupled to the ARC material gas distribution system 162, the oxidized ARC material gas distribution system 164, the position system 180 and the load station 178. The control system 156 is programmed/and or configured to control and operate the various components within the processing system 150 in order to carry out the various functions described herein.

The memory 160 may include read only memory (ROM) and random access memory (RAM). The ROM contains among other code the Basic Input-Output System (BIOS) which controls the basic hardware operations of the system 150. The RAM is the main memory into which the operating system and application programs are loaded. The memory 160 also serves as a storage medium for temporarily storing information such as temperature, temperature tables, position coordinate tables, interferometry information, thickness tables, and algorithms that may be employed in carrying out the present invention. The memory 160 also can hold patterns against which observed data can be compared as well as information concerning grating sizes, grating shapes, ellipsometry information, achieved profiles, desired profiles and other data that may be employed in carrying out the present invention. For mass data storage, the memory 160 may include a hard disk drive.

A power supply 170 provides operating power to the system 150. The system further may include a display 154 operatively coupled to the control system 156 for displaying a representation (e.g., graphical and/or text) of one or more process conditions, such as film thickness, temperature, gas flow rates, etc. The display 154 further may show a graphical and/or textual representation of the measured optical properties (e.g., refraction index and absorption constant) at various locations along the surface of the substrate.

Figure 6:
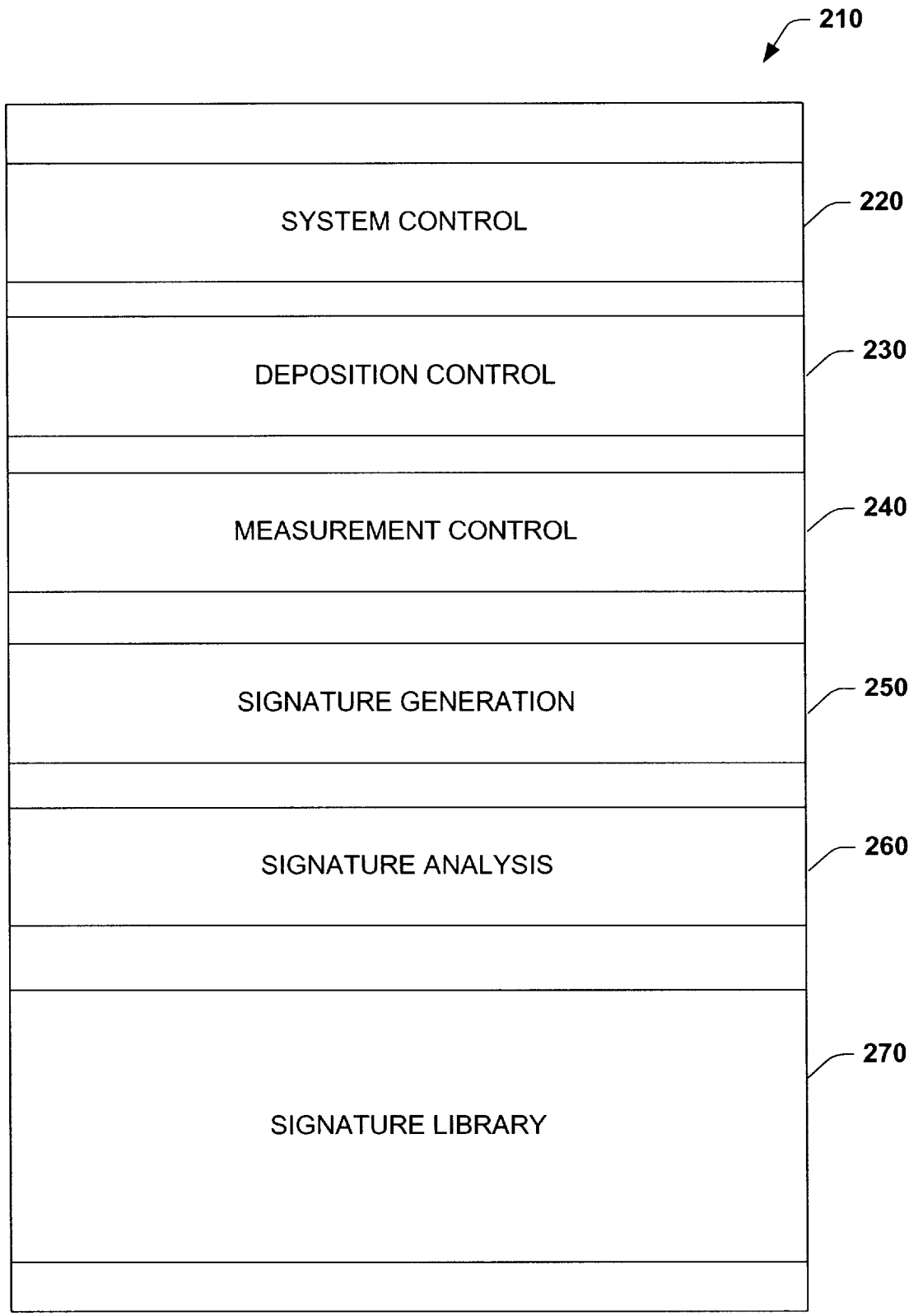
FIG. 6 is a block diagram of program modules that reside in a memory system in accordance with one aspect of the present invention.

FIG. 6 illustrates a plurality of program modules that can reside in a memory 210 employed in the systems illustrated in FIGS. 4–5. The memory 210 includes a system control module 220 for controlling the initialization of components in the system, the load system, the positioning system and rotation of the chuck. The system control module 220 also operates as a kernel for providing a central communication mechanism between the other modules in the memory 210. A deposition control module 230 provides control for enabling and disabling the ARC material gas distribution system and the oxidation system or the oxidized ARC material gas distribution system. The measurement control module 240 initializes and controls the spectroscopic ellipsometry system for operating the broadband light source, rotation of the polarizer or analyzer and sampling of the detector. A signature generation module 250 aggregates the raw signal samples from the ellipsometry system and provides an actual measured signature of the thickness of the oxidized ARC material layer and/or ARC material layer. The signature analysis module 260 searches a signature library 270 and compares the actual measured signature(s) with stored signatures in the signature library 270.

Once a match of the signatures is determined, a corresponding thickness is determined and passed back to the system control module 220. The system control module 220 then determines if the optimal thickness has been achieved. If the optimal thickness has been achieved, the system control module 220 notifies the deposition control module 230 to terminate deposition of the material or oxidation of the material.

Figure 7:
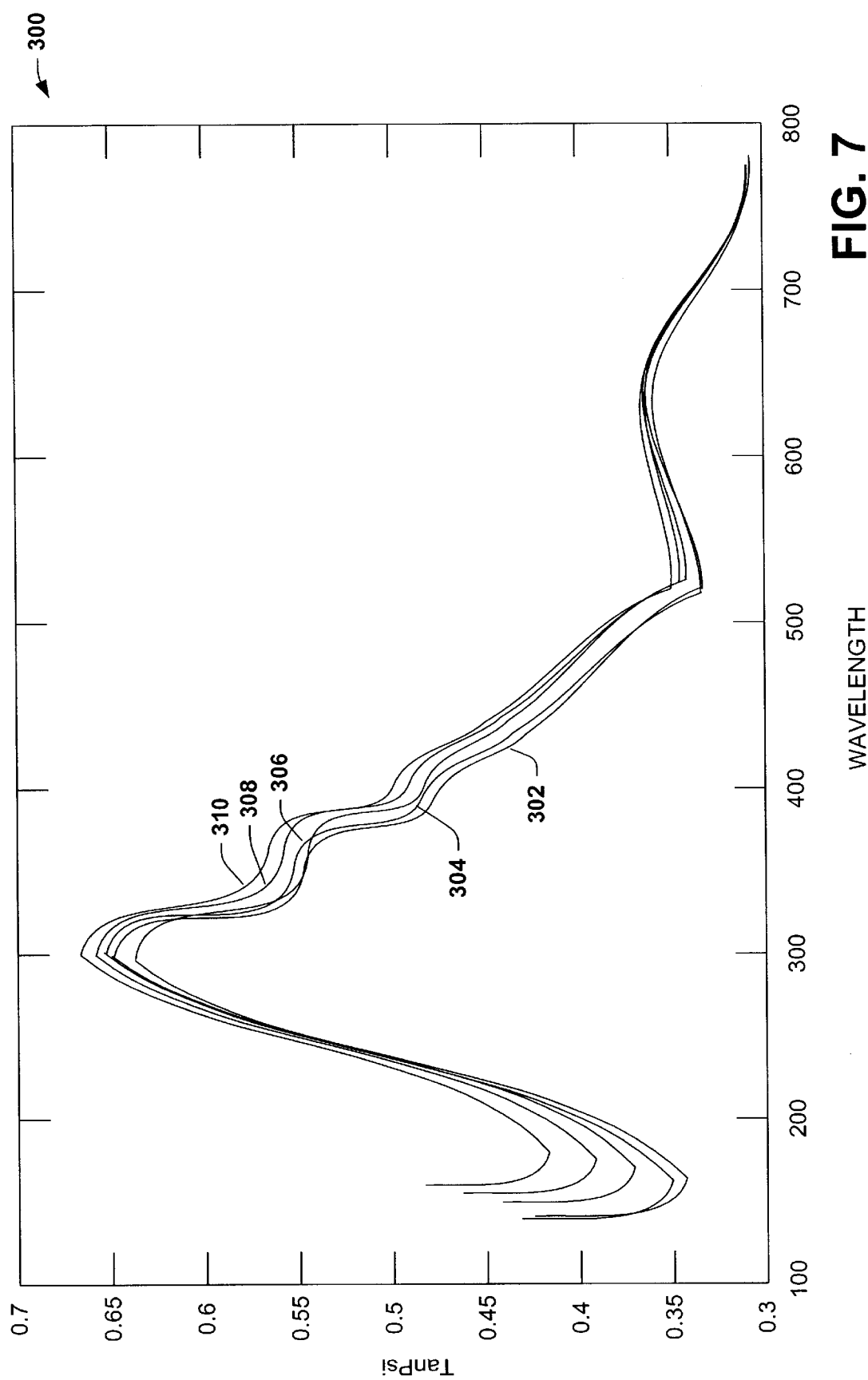
FIG. 7 is a graph of tan (PSI) versus wavelength for various signatures corresponding to the thickness of an oxidized portion of an ARC layer in accordance with one aspect of the present invention.

FIG. 7 illustrates a graph 300 of various thickness signatures plotted as tan (PSI) versus the broadband wavelength (e.g., 100–800 nm). Each signature corresponds to an oxide thickness residing on a multi-layer structure. The multi-layer structure includes 20 nm of SiON ARC layer on 150 nm of polysilicon on 2.5 nm of silicon dioxide on a silicon substrate. A first signature 302 corresponds to a thickness of 0.5 nm. A second signature 304 corresponds to a thickness of 1.0 nm and a third signature 306 corresponds to a thickness of 1.5 nm. A fourth signature 308 corresponds to a thickness of 2.0 nm, while a fifth signature 310 corresponds to a thickness of 2.5 nm.

Figure 8:
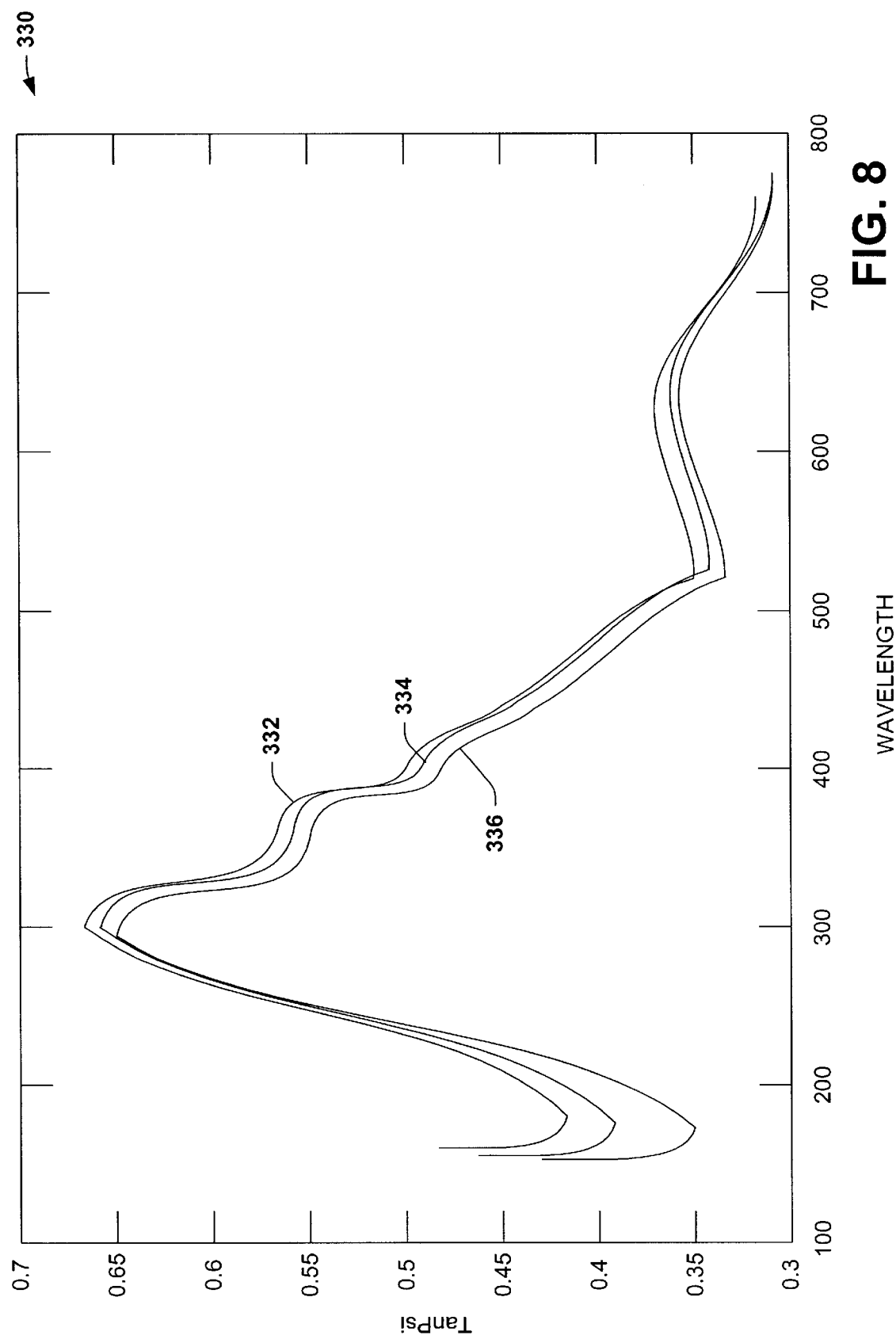
FIG. 8 is a graph of tan (PSI) versus wavelength for various signatures corresponding to the thickness of an ARC layer in accordance with one aspect of the present invention.
Figure 9:
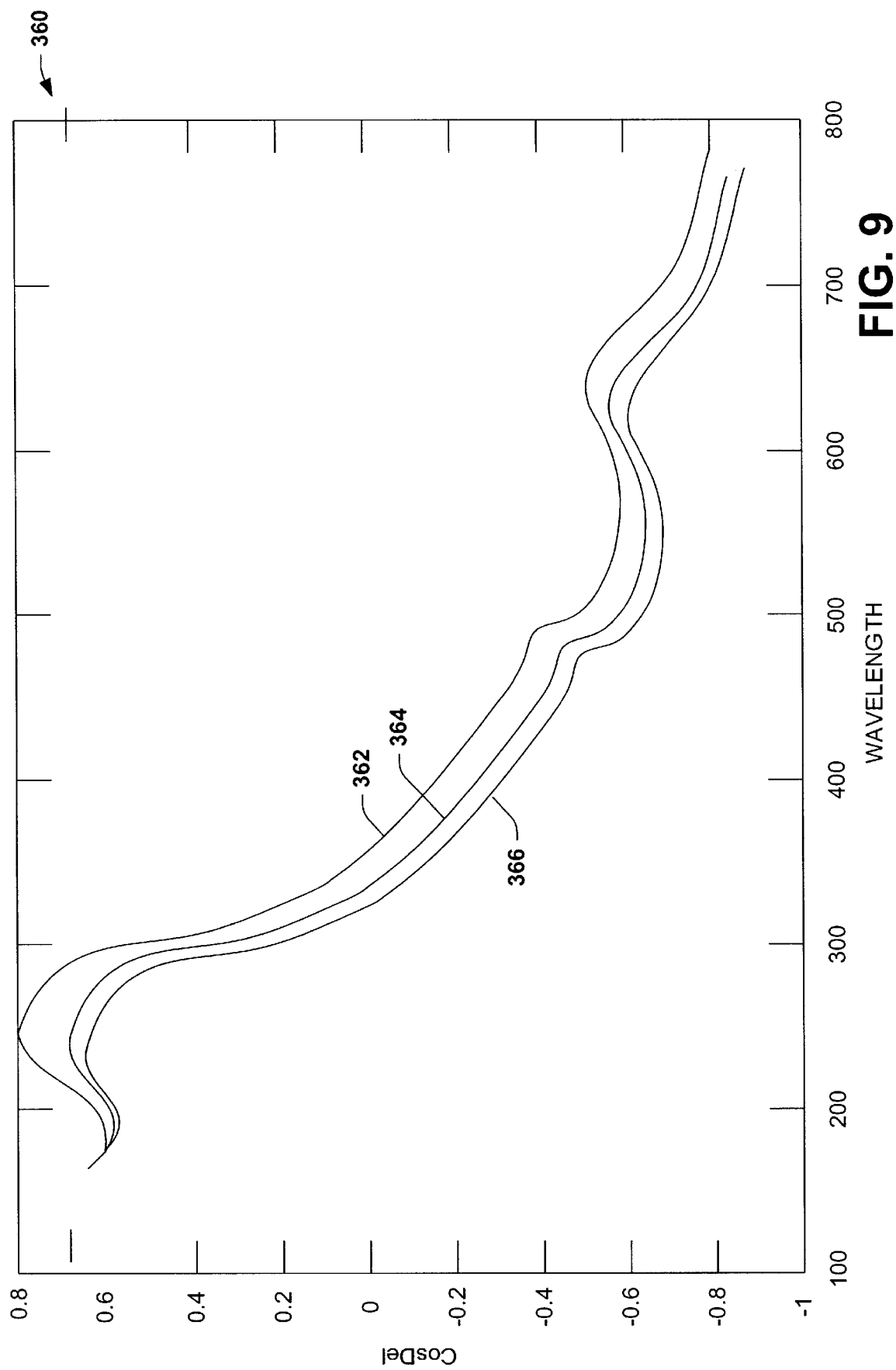
FIG. 9 is a graph of cos (DELTA) versus wavelength for various signatures corresponding to the thickness of an ARC layer in accordance with one aspect of the present invention.

FIG. 8 illustrates a graph 330 of various thickness signatures plotted as tan (PSI) versus the broadband wavelength (e.g., 100–800 nm) for an ARC layer. Each signature corresponds to a silicon oxynitride layer thickness residing on a multi-layer structure. The multi-layer structure includes 1.5 nm of oxide on a SiON ARC layer on 150 nm of polysilicon on 2.5 nm of silicon dioxide on a silicon substrate. A first signature 332 corresponds to a thickness of 19 nm. A second signature 334 corresponds to a thickness of 20 nm and a third signature 336 corresponds to a thickness of 21 nm. FIG. 9 illustrates a graph 360 of various thickness signatures plotted as cos (DELTA) versus the broadband wavelength (e.g., 100–800 nm) corresponding to a thickness of the ARC layer. A first signature 362 corresponds to a thickness of 19 m. A second signature 364 corresponds to a thickness of 20 nm and a third signature 366 corresponds to a thickness of 21 nm.

The signatures of FIGS. 7–9 can be stored in a library of signatures and employed to control the thickness of the SiON layer and the oxidized portion of the SiON layer by in-situ monitoring and control. It is to be appreciated that the signatures are for illustrative purposes and signatures may vary based on different thickness of the multi-layer structure and broadband wavelength.

Figure 10:
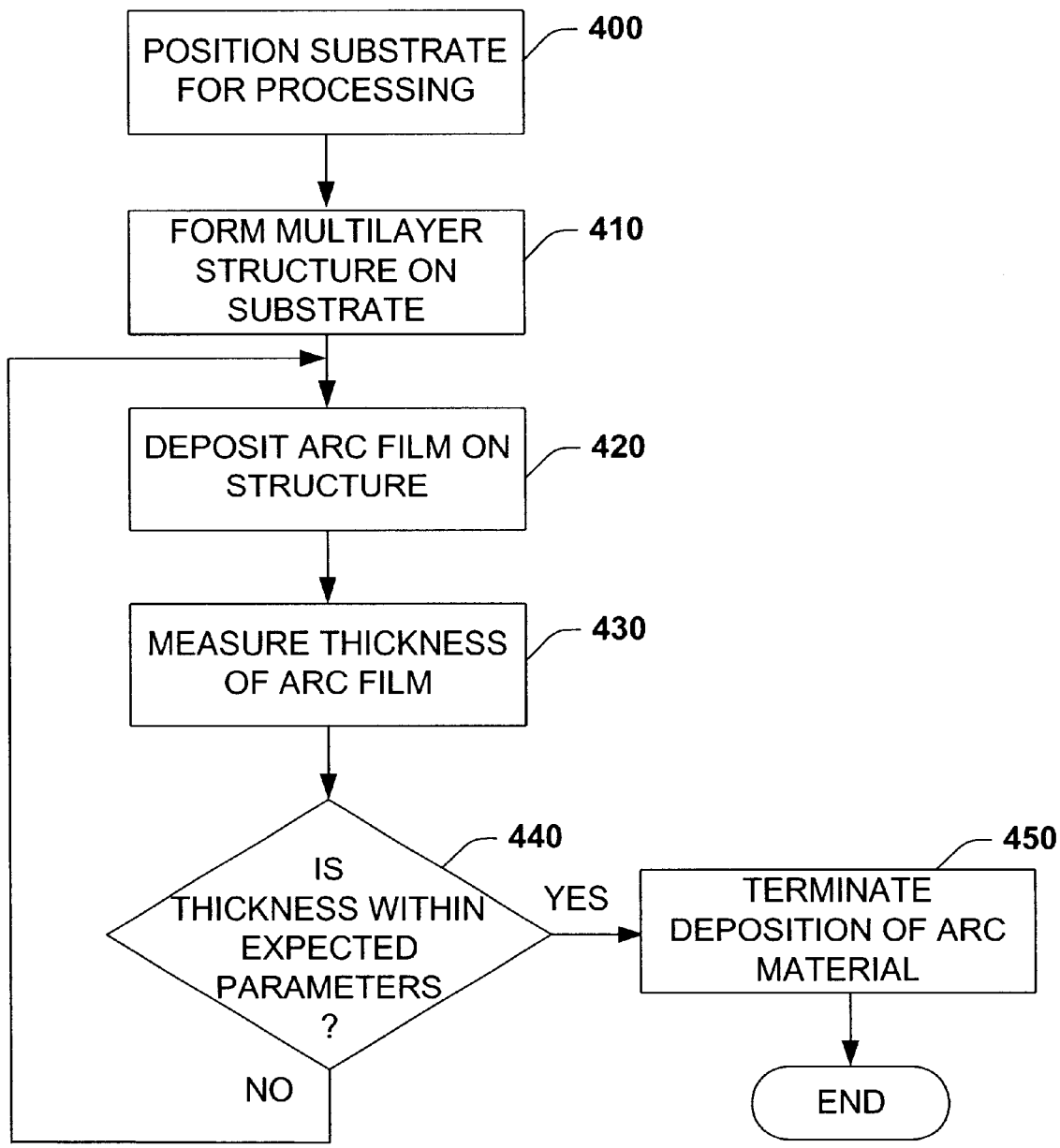
FIG. 10 is a flow diagram illustrating a methodology for measuring a thickness of an ARC layer in accordance with one aspect of the present invention.
Figure 11:
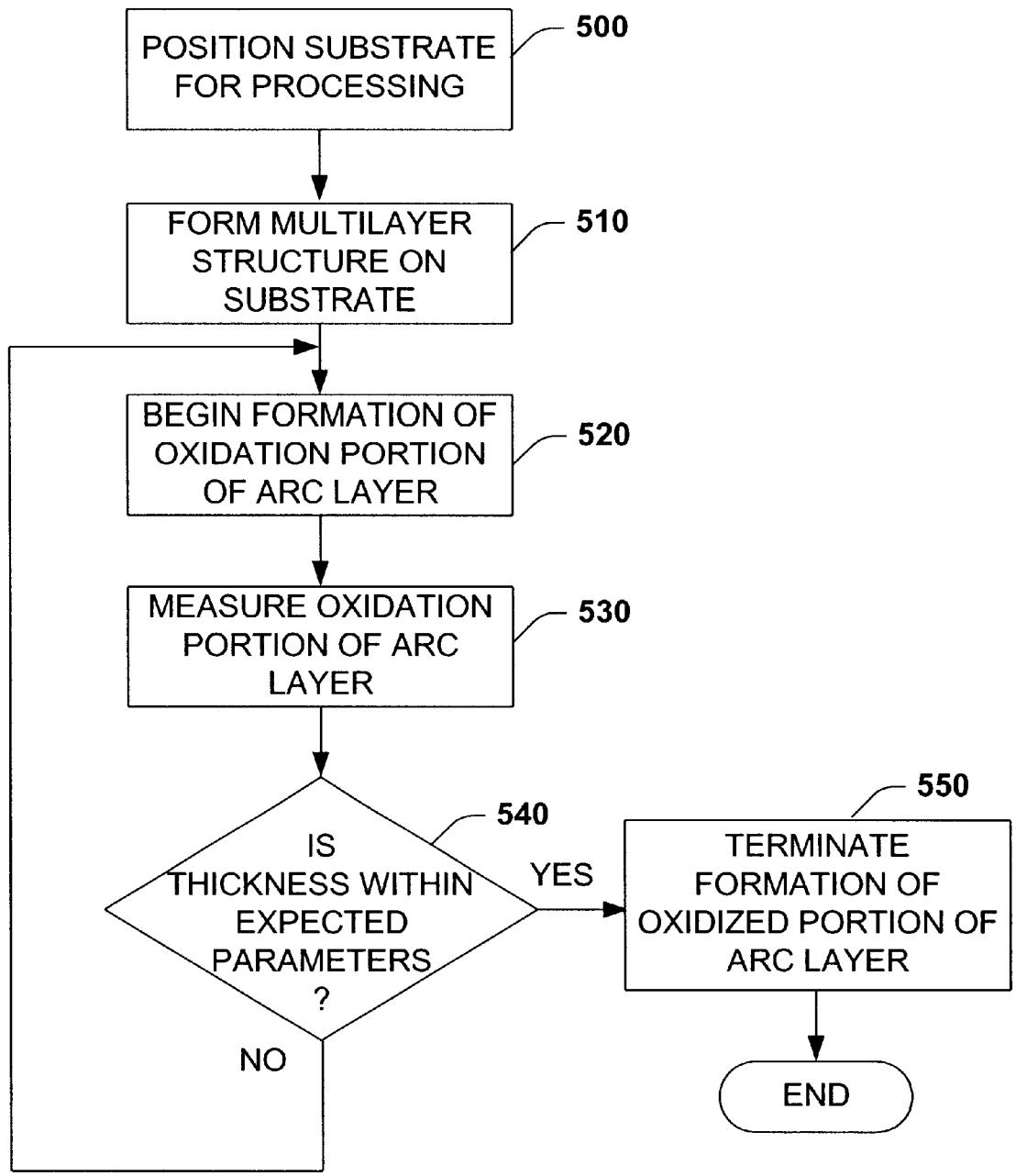
FIG. 11 is a flow diagram illustrating a methodology for measuring a thickness of an oxidized portion of an ARC layer in accordance with one aspect of the present invention.

In view of the exemplary systems shown and described above, a methodology, which may be implemented in accordance with the present invention, will be better appreciated with reference to the flow diagrams of FIGS. 10 and 11. While, for purposes of simplicity of explanation, the methodologies of FIGS. 10 and 11 are shown and described as executing serially, it is to be understood and appreciated that the present invention is not limited by the illustrated order, as some blocks may, in accordance with the present invention, occur in different orders and/or concurrently with other blocks from that shown and described herein. Moreover, not all illustrated blocks may be required to implement a methodology in accordance with the present invention.

Turning now to FIG. 10, the methodology begins at 400 in which a substrate is positioned within an appropriate environment for desired processing. In this example, the processing is to include formation of an ARC film layer over a multi-layer structure, such as, for example, a silicon oxynitride (SiON) ARC layer formed over a polysilicon layer over an oxide layer over a silicon substrate.

After the substrate is positioned, the process proceeds to 410 in which a multilayer structure is formed on the substrate. At 420, deposition of the ARC layer over the multi-layer structure begins. As mentioned above, ARC layer film formation may occur on a substrate, such as wafer, through a known deposition or film growth technique. The process then proceeds to 430.

At 430, the thickness of the thin layer being formed is measured. By way of example, the layer thickness is measured in-situ by a spectroscopic ellipsometry, although other non-destructive thickness measuring techniques also could be utilized in accordance with the present invention.

From 430, the process proceeds to 440 in which a determination is made as to whether the measured thickness is within expected operating parameters. This determination, for example, may include a comparison of the measured thickness with an expected (or target) value, such as may be derived based on previous processes, calculations using monitored operating conditions within the processing chambers, and/or a combination thereof. For example, a signal signature indicative of reflected and/or refracted light may be compared relative to a signature library to provide an indication of the thickness based on its magnitude and/or phase of the reflected and/or refracted light. If the thickness is within expected operating parameters, the process proceeds to 450. At 450, the process terminates the deposition of the ARC material. If the thickness is not within expected operating parameters, the process returns to 420 and continues the deposition process.

FIG. 11 is another example of a flow diagram illustrating a methodology that may be employed, in accordance with an aspect of the present invention, to help form an oxidized portion of the ARC film layer having a desired thickness. The methodology begins at 500 in which a substrate is positioned within an appropriate environment for desired processing. In this example, the processing is to include formation of an oxidized portion of an ARC film layer over an ARC film layer over a multi-layer structure, such as, for example, an oxidized silicon oxynitride layer over a silicon oxynitride (SiON) ARC layer formed over a polysilicon layer over an oxide layer over a silicon substrate.

After the substrate is positioned, the process proceeds to 510 in which a multi-layer structure is formed on the substrate including deposition of an ARC layer over the multi-layer structure. As mentioned above, ARC layer film formation may occur on a substrate, such as wafer, through a known deposition or film growth technique. The process then proceeds to 520.

At 520, formation of the oxidized portion of the ARC layer begins. The oxidized layer may be formed by injecting oxygen into a process chamber in which the substrate resides as discussed with respect to FIG. 4. Alternatively, the oxidized layer may be formed by deposition of an oxidized material layer as discussed with respect to FIG. 5. At 530, the thickness of the oxidized portion of the ARC layer being formed is measured. By way of example, the film thickness is measured in-situ by a spectroscopic ellipsometry, although other non-destructive thickness measuring techniques also could be utilized in accordance with the present invention.

From 530, the process proceeds to 540 in which a determination is made as to whether the measured thickness is within expected operating parameters. This determination, for example, may include a comparison of the measured thickness with an expected (or target) value, such as may be derived based on previous processes, calculations using monitored operating conditions within the processing chambers, and/or a combination thereof. For example, a signal signature indicative of reflected and/or refracted light may be compared relative to a signature library to provide an indication of the thickness based on its magnitude and/or phase of the reflected and/or refracted light. If the thickness is within expected operating parameters, the process proceeds to 550. At 550, the process terminates the formation of the oxidation portion of the ARC layer. If the thickness is not within expected operating parameters, the process returns to 520 and continues the formation of the oxidized portion of the ARC layer.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A semiconductor processing system, comprising:
    a processing chamber operable to form an oxidized portion of an anti-reflective layer over an anti-reflective layer formed on a substrate located in the chamber; a measurement system for in-situ measuring a thickness of the oxidized portion being formed and for providing a measurement signal indicative of the measured thickness, the measurement system comprising:
        a memory storing a library of signatures corresponding to various thicknesses of the oxidized portion
        a control system that analyzes a spectrum of wavelengths corresponding the thickness of the oxidized portion, the control system generates a signature based at least in part on the reflected spectrum of wavelengths and searches the library for a match to the generated signature to facilitate determination of the thickness of the oxidized portion.

2. The system of claim 1, further comprising a control system for controlling operating characteristics of the formation environment within the chamber, the control system adjusting the operating characteristics to control formation of the oxidized portion based on the measurement signal.

3. The system of claim 2, further comprising an oxidation system adapted to inject oxygen into the chamber and oxidized a top portion of the anti-reflective layer to form the oxidized portion of the anti-reflective layer, the oxidation system being controlled by the control system.

4. The system of claim 2, further comprising an oxidized anti-reflective material distribution system operable to deposit oxidized anti-reflective material onto the anti-reflective material layer to form the oxidized portion, the oxidized anti-reflective material distribution system being controlled by the control system.

5. The system of claim 1, the measurement system being a spectroscopic ellipsometry system.

6. The system of claim 5, the spectroscopic ellipsometry system including a broadband light source for generating a spectrum of wavelengths at the oxidized portion, a polarizer to create a known polarizer state of the spectrum of wavelengths, an analyzer to mix the polarization states of the spectrum of wavelengths after reflection from the oxidized portion and a detector to measure the intensity of the reflected spectrum of wavelengths.

7. The system of claim 6, the detector transmitting the measured intensity of the reflected spectrum of wavelengths to a control system, the control system being further adapted to generate a signature of the reflected spectrum of wavelengths that corresponds to the thickness of the oxidized portion.

8. The system of claim 7 wherein the control system controls a formation time period during which the oxidized portion is formed, the control system controlling the formation time period based on the determined thickness.

9. The system of claim 7, the control system generating a tan (PSI) signature component and cos (DELTA) signature component corresponding to the oxide portion thickness.

10. The system of claim 7, further including a display operatively coupled to the control system and operative to display a visual representation of the measured thickness of the oxidized portion during fabrication.

11. The system of claim 1, the measurement system being a spectroscopic reflectometry system.

12. The system of claim 1, the anti-reflective layer being formed of SiON and the oxidized portion being formed of oxidized SiON.

13. The system of claim 1, the oxidized portion mitigating footing problems associated with utilizing deep ultraviolet (DUV) resist.

14. A system for monitoring formation of an oxide portion of an anti-reflective layer in a semiconductor fabrication process, comprising:
    a processing chamber operable to form an oxidized portion of an anti-reflective layer over an anti-reflective layer formed on a substrate located in the chamber;
    means for in-situ measuring a thickness of the oxidized portion being formed and for providing a measurement signal indicative of the measured thickness, the means for measuring comprising:
        means for storing a library of signatures corresponding to various thicknesses of the oxidized portion; and
        means for analyzing a spectrum of wavelengths corresponding the thickness of the oxidized portion, the control system generates a signature based at least in part on the reflected spectrum of wavelengths and searches the library for a match to the generated signature to facilitate determination of the thickness of the oxidized portion.

15. The system of claim 14, further comprising control means for controlling formation of the oxidized portion, the control means adjusting operating characteristics associated with the formation of the oxidized portion based on the measurement signal.

16. The system of claim 15, the generated signature and the library of signatures having a tan (PSI) signature component and cos (DELTA) signature component corresponding to a particular oxide portion thickness.

17. The system of claim 14, wherein the operating characteristics comprise a formation time period during which the oxidized portion is formed, the control means controlling the formation time period based on the measurement signal.

18. The system of claim 14, the means for providing a measurement signal indicative of the measured thickness of the oxidized portion comprising a spectroscopic ellipsometry system.

19. The system of claim 14, the means for measuring comprising a spectroscopic reflectometry system.

20. The system of claim 14, the anti-reflective layer being formed of SiON and the oxidized portion being formed of oxidized SiON.

21. A semiconductor processing method employing the system of claim 1.

22. The method of claim of 21, further comprising adjusting operating characteristics of formation of the oxidized portion to control formation of the oxidized portion as a function of the determined thickness.

23. The method of claim 21, the generated signature and the library of signatures having a tan (PSI) signature component and cos (DELTA) signature component corresponding to a particular oxide portion thickness.

24. The method of claim 23, further comprising controlling a formation time period based on the determined thickness.

25. The method of claim 21, the anti-reflective layer being formed of SiON and the oxidized portion being formed of oxidized SiON.

26. The method of claim 21, the light beam being a polarized broadband light beam.

\* \* \* \* \*